United States Patent
Steder et al.

(12)

(10) Patent No.: US 11,650,074 B2
(45) Date of Patent: May 16, 2023

(54) METHOD OF CREATING A MAP, METHOD OF DETERMINING A POSE OF A VEHICLE, MAPPING APPARATUS AND LOCALIZATION APPARATUS

(71) Applicant: SICK AG, Breisgau (DE)

(72) Inventors: Bastian Steder, Freiburg (DE); Fabian Fischer, Waldkirch (DE); Patrick Schopp, Freiburg (DE); Christoph Hansen, Hamburg (DE)

(73) Assignee: SICK AG, Waldkirch/Breisgau (DE)

( * ) Notice: Subject to any disclaimer, the term of this patent is extended or adjusted under 35 U.S.C. 154(b) by 100 days.

(21) Appl. No.: 17/008,921

(22) Filed: Sep. 1, 2020

(65) Prior Publication Data
US 2021/0063201 A1 Mar. 4, 2021

(30) Foreign Application Priority Data
Sep. 4, 2019 (DE) .......................... 102019123659.2

(51) Int. Cl.
*G01C 21/00* (2006.01)
*G05D 1/02* (2020.01)

(52) U.S. Cl.
CPC ....... *G01C 21/3848* (2020.08); *G05D 1/0234* (2013.01); *G05D 1/0259* (2013.01); *G05D 1/0274* (2013.01)

(58) Field of Classification Search
CPC ............. G01C 21/3848; G05D 1/0234; G05D 1/0259; G05D 1/0274
See application file for complete search history.

(56) References Cited

U.S. PATENT DOCUMENTS

| 5,270,937 A | * | 12/1993 | Link | G01C 21/30 |
| | | | | 340/995.19 |
| 8,326,512 B2 | * | 12/2012 | Klotz | B60W 30/16 |
| | | | | 701/519 |

(Continued)

FOREIGN PATENT DOCUMENTS

| DE | 102015013839 A1 | 3/2016 |
| DE | 102015214338 A1 | 2/2017 |

(Continued)

OTHER PUBLICATIONS

European Search Report dated Feb. 24, 2021 corresponding to application No. 20191461.1-1001.

(Continued)

*Primary Examiner* — Thomas Ingram
(74) *Attorney, Agent, or Firm* — Nath, Goldberg & Meyer; Jerald L. Meyer

(57) ABSTRACT

The invention relates to a method of creating a map of a navigation region of a vehicle, the method comprising:
traveling along a path, predefined by a track guidance marking present in the navigation region, with the vehicle; determining distances of the vehicle from objects possibly present in an environment of the path; and creating the map based on the track guidance marking and on the distances.
The invention further relates to a method of determining a pose of a vehicle in a navigation region, the method comprising:
determining a position of the vehicle relative to a track guidance marking present in the navigation region; determining distances of the vehicle from objects possibly present in an environment of the vehicle; and determining the pose based on the position, on the distances, and on a
(Continued)

Figure 3A:
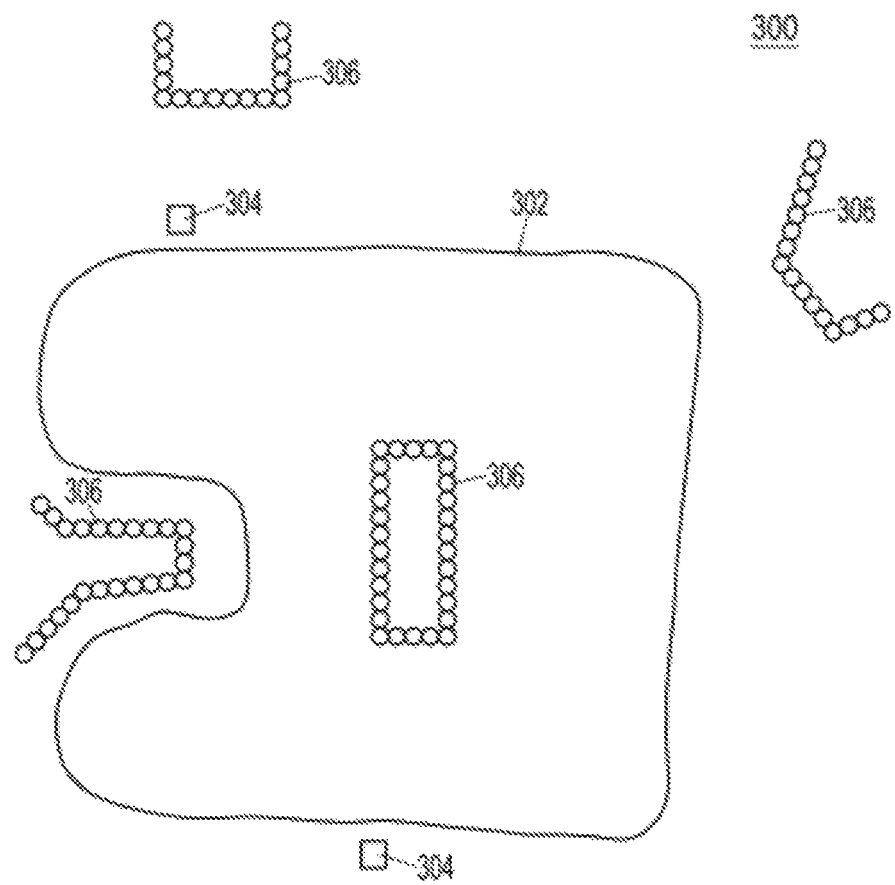

map. The invention further relates to a corresponding mapping apparatus and to a corresponding localization apparatus.

16 Claims, 8 Drawing Sheets

(56) References Cited

U.S. PATENT DOCUMENTS

| | | | | |
|---|---|---|---|---|
| 2004/0044477 | A1* | 3/2004 | Jung | G01C 21/30 |
| | | | | 702/5 |
| 2006/0243537 | A1* | 11/2006 | Finn | B66B 1/3492 |
| | | | | 187/394 |
| 2008/0009964 | A1* | 1/2008 | Bruemmer | G05D 1/0223 |
| | | | | 700/245 |
| 2012/0303255 | A1 | 11/2012 | Wong et al. | |
| 2017/0233231 | A1 | 8/2017 | Gariepy et al. | |
| 2018/0028607 | A1 | 2/2018 | Wen | |
| 2018/0089616 | A1 | 3/2018 | Jacobus et al. | |
| 2018/0199162 | A1* | 7/2018 | Yamamoto | G01S 19/07 |
| 2018/0286072 | A1 | 10/2018 | Tsai et al. | |
| 2018/0336782 | A1* | 11/2018 | Chase | G05D 1/0088 |
| 2019/0302801 | A1* | 10/2019 | Zlot | H04W 4/46 |

FOREIGN PATENT DOCUMENTS

| | | |
|---|---|---|
| DE | 102016211805 A1 | 4/2017 |
| DE | 102018009114 A1 | 6/2019 |
| EP | 2918974 A1 | 9/2015 |
| EP | 3167342 B1 | 3/2018 |

OTHER PUBLICATIONS

Office Action dated Apr. 1, 2020 corresponding to German application No. 102019123659.2.

Communication received from the European Patent Office dated Jun. 20, 2022 corresponding to application No. 20191461.1-1009.

* cited by examiner

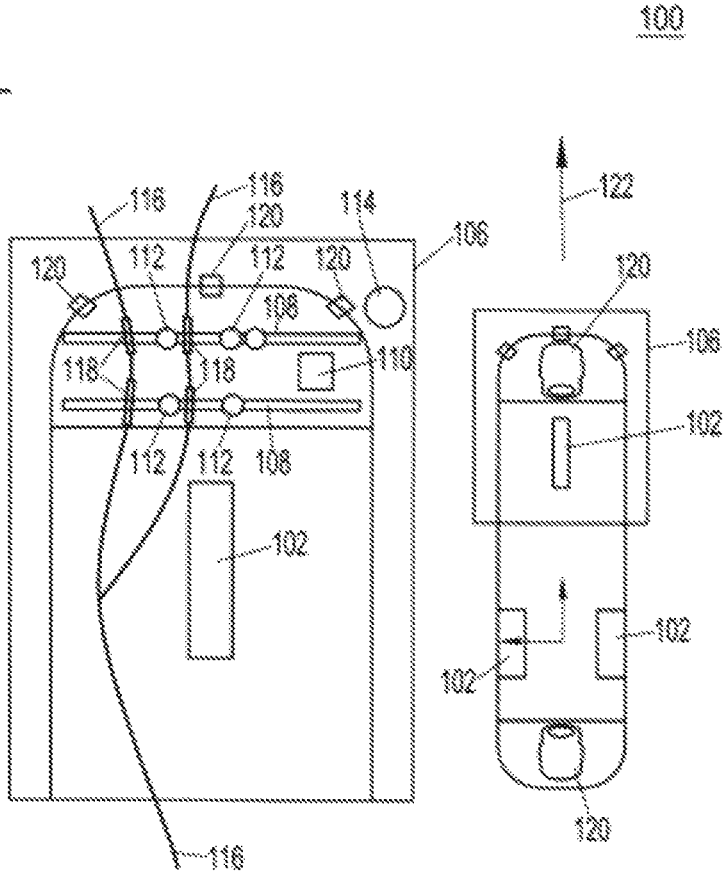

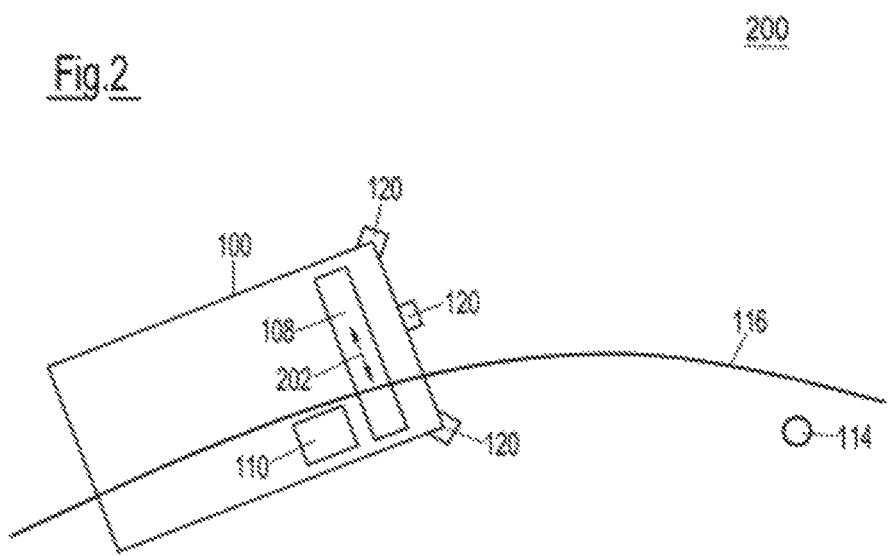

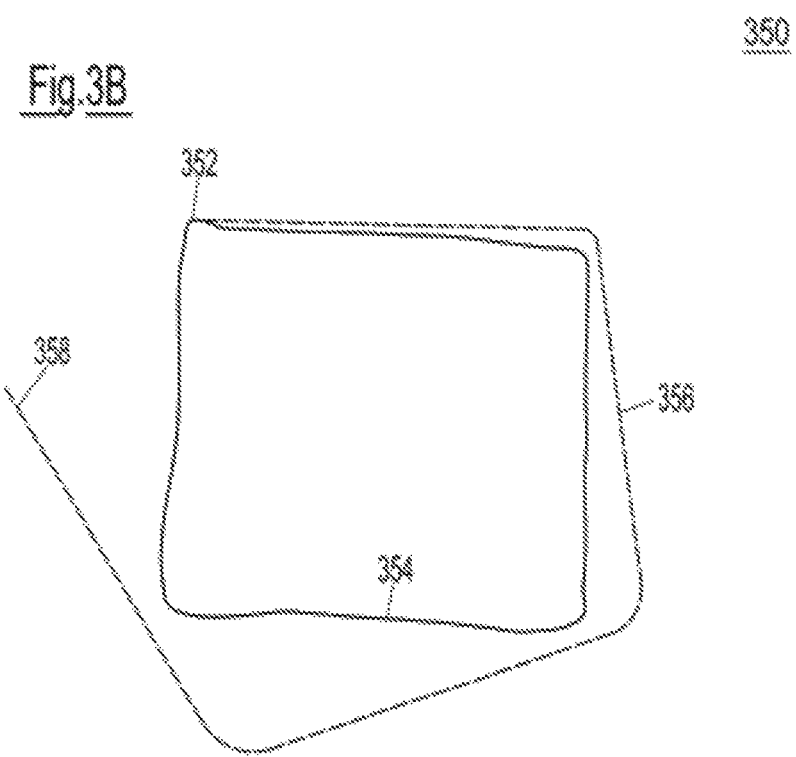

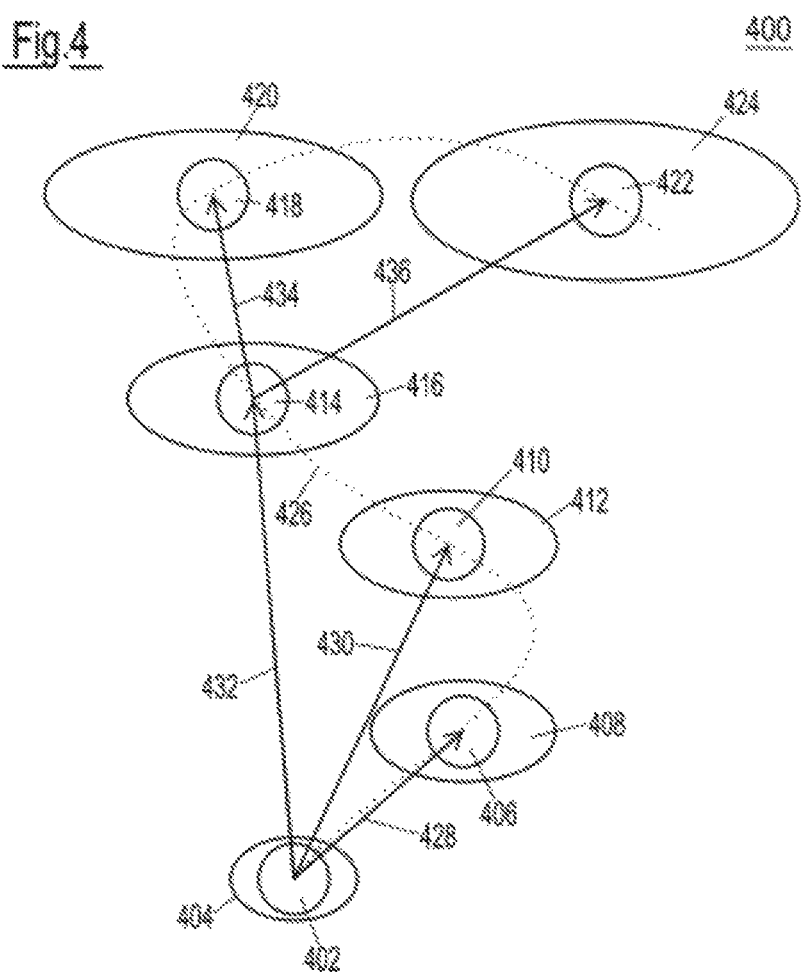

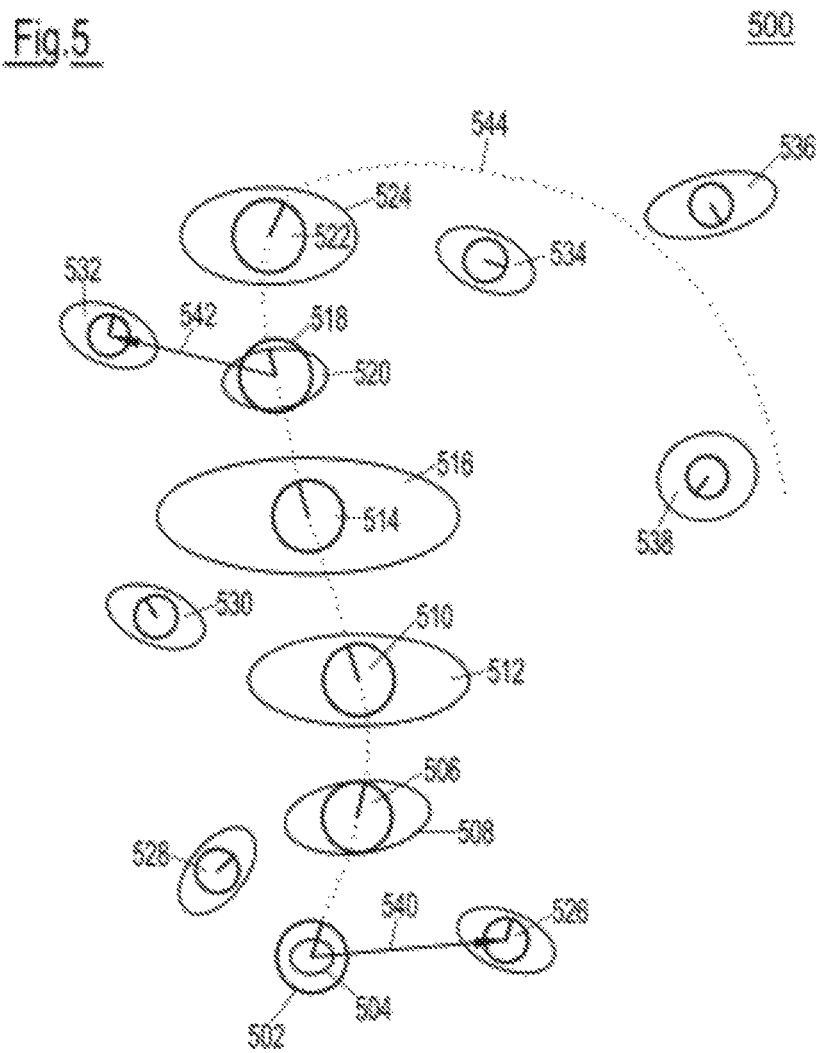

METHOD OF CREATING A MAP, METHOD OF DETERMINING A POSE OF A VEHICLE, MAPPING APPARATUS AND LOCALIZATION APPARATUS

The present invention relates to a method of creating a map, to a method of determining a pose of a vehicle, to mapping apparatus, and to localization apparatus.

Conventionally, automated guided vehicles (AGVs) usually navigate by means of track guidance. In this respect, a continuous track (in other words: a guideline, for example, an optically readable or magnetic tape) is glued to the floor or embedded in the floor and is detected by means of suitable sensor technology (for example, a camera or a Hall sensor). The track guidance sensors e.g. output the distance from the center of the track. The journey of the AGV can be regulated using this information such that the AGV follows the continuous guideline. In this respect, in particular no absolute localization and no path planning are required for the AGV.

In addition, markings are used in the track guidance to transmit or send control signals, such as "drive slowly" or "turn right", to the AGV. These markings are usually codes, for example numbers or sequences of numbers, that are either transmitted optically, for example in the form of barcodes, or by near-field radio technology, for example in the form of RPI© tags (radio-frequency identification tags), when the AGV or a code sensor attached to the AGV travels over the marking. For this purpose, these markings are glued to the floor along the lane or are embedded in the floor.

Tracks embedded in the floor are not very flexible. Changing the routes of the AGVs is only possible with great effort. Therefore, they are used less and less in modern production environments.

Glued-on tracks offer greater flexibility. They can be installed without extensive modifications to the system. However, the tracks are exposed to a high load during the operation of the system. Glued-on codes are susceptible to wear and abrasion due to production-related traffic. Fork-lift trucks or tugger trains regularly travel over the tracks. This can lead to defects of the track that have the result that vehicles that are dependent on a certain track cannot travel onward. The defects of the track then have to be repaired by service personnel to prevent a standstill of the system. Furthermore, it frequently occurs that the markings required to control the AGV are defective due to abrasion or contamination.

Alternatively, AGVs can be controlled by means of laser localization instead of track guidance. The laser localization system outputs the absolute position of the vehicle as a measurement value in this respect. The AGV then has to independently plan the route from its current position to the destination (or to a number of intermediate destinations, that is, along a predefined path) by means of path planning and has to regulate it using the absolute position measurement. This is far more complex and expensive than the above-mentioned method of track guidance. The use of trained specialized staff is necessary in the event of disruptions to the path planning.

Trained specialized staff is also necessary for putting a laser navigation system into operation. The environment of the system in particular has to be mapped in this respect.

It is an object of the invention to provide an improved and reliable navigation system that allows a control of the AGV that is as simple as that of a track guidance, both with respect to the operation and the putting into operation, and that is compatible with existing track guidance controls.

The object is satisfied by a method of creating a map of a navigation region of a vehicle having the features of claim 1, by a method of determining a pose of a vehicle in a navigation region having the features of claim 12, by a mapping apparatus having the features of claim 15, and by a localization apparatus having the features of claim 16.

A method in accordance with the invention of creating a map of a navigation region of a vehicle comprises the steps:
  traveling along a path, predefined by a track guidance marking present in the navigation region, with the vehicle;
  determining distances of the vehicle from objects possibly present in an environment of the path; and
  creating the map based on the track guidance marking and on the distances.

In other words, a map is created based on the fact that the vehicle follows a path predefined by a track guidance marking while recording distance information. In addition to the distance information, the map can also include information on the track guidance marking. The track guidance marking can therefore not only be used to guide the vehicle during the map recording, but it can also be part of the map.

It is advantageously made possible by the method to create a map without an external apparatus (neither external sensors outside the vehicle nor a computer apparatus for recording or specifying the path to be traveled along) being necessary for this purpose.

Furthermore, due to the use of both the distance information and the track guidance marking, the map is robust against failure of one of the pieces of information. The map can in particular be used even if the track guidance marking is damaged or partly or completely removed after the map is created.

The map can either be created directly on the vehicle or it can be created in the central apparatus after the transmission of the measurement values determined (for example, the distances determined and the track guidance marking determined) to a central apparatus (for example, a computer system). After the creation of the map, the map can be stored, for example, on the vehicle or on a storage medium outside the vehicle. The map can then be used on the vehicle with whose help it was created or on another vehicle; the map can therefore be copied onto one vehicle or onto a plurality of vehicles. The central apparatus and/or the storage medium can be connected to the vehicle via a wireless communication interface (e.g. via radio or a WLAN interface).

The track guidance marking is suitable for predefining the path without further markings or navigation specifications so that the vehicle can follow the track guidance marking independently. The path of the vehicle is therefore solely predefined by the track guidance marking. The track guidance marking can be present on the floor (that is, it can be attached to the floor) or it can be present in the floor (that is, it can be embedded in the floor).

The method can furthermore, if applicable, comprise the attachment or insertion of the track guidance marking before the traveling along of the path with the vehicle.

The track guidance marking can be an optical track guidance marking, an electrical track guidance marking, a magnetic track guidance marking, or an (optically and/or electrically and/or magnetically) mixed track guidance marking.

The track guidance marking includes a track along which the vehicle is to move and, if applicable, codes for controlling the vehicle. For example, the codes can include speed specifications (e.g. before or after curves or at the destination) or indications of direction (e.g. at junctions).

The distances and the track guidance marking can be determined relative to the vehicle while the vehicle travels along the path so that a respective distance can be determined with respect to a plurality of positions on the path and information on whether a track guidance marking is present at this position can be determined.

The distances can be measured via distance sensors (e.g. radar, laser/lidar, infrared, ultrasound, camera, stereo camera, time-of-flight camera (TOF camera)). The track guidance marking can be determined via an optical sensor and/or an electrical sensor and/or a magnetic sensor, for example, a line sensor that is attached at least substantially transversely (e.g. at least substantially perpendicular) to the usual direction of travel of the vehicle.

Advantageously, the method in accordance with the invention further comprises determining at least one estimated position of the vehicle based on an estimated movement of the vehicle. It thereby becomes possible to create a map in which information is stored for different positions in the map as to whether an object is present at this position (this is ensured by the determination of the distances) and whether a track guidance marking is present at this position (this is ensured by the recognition of the track guidance marking).

The recognition of the track guidance marking is necessary for traveling along the path predefined by the track guidance marking; however, the track guidance marking can also be entered into the map (that is, it can be mapped) if the estimated position of the vehicle is known.

The movement of said vehicle can in particular be estimated based on the distances and/or based on measurements of a speed of at least one wheel of the vehicle. In this respect, with knowledge of a current position of the vehicle, a next position of the vehicle can be estimated based on a change of the distances. Furthermore, by knowing the speed (for example, the rotational speed) of the wheels and the diameters of the wheels, assuming a known slip of the wheels, the absolute speed of the vehicle can be estimated and an estimated position change can be determined based thereon.

The map can thereby advantageously be based on the estimated position. For a plurality of estimated positions, it can therefore be entered in the map whether an object is present at a distance relative to the estimated position or whether a track guidance marking is present at the estimated position.

The objects entered in the map and the track guidance marking entered in the map (comprising the path and, if applicable, codes) can later be used for the localization of the vehicle in the navigation region. Furthermore, the information on the track guidance marking can be used to predefine the path of the vehicle. The track guidance marking in the map can therefore have two functions: the track guidance marking can be used for localization and the track guidance marking can be used for predefining the path.

Therefore, for a plurality of estimated positions, the map has position information on objects in an environment of the estimated position and information on a track guidance marking present at the estimated position.

In accordance with an advantageous embodiment of the method, the method can furthermore comprise: determining whether a current actual position of the vehicle along the path corresponds to an already previously approached actual position of the vehicle; and, if is determined that the current actual position corresponds to the already previously approached actual position, performing a correction of the map to bring together the estimated position determined at the current actual position of the vehicle and the estimated position determined at the already previously approached actual position of the vehicle. Together with the estimated position determined at the current actual position of the vehicle and with the estimated position determined at the already previously approached actual position of the vehicle, the respective measurement values (that is, the distances and the track guidance marking that are determined at the current actual position and the distances and the track guidance marking determined at the already previously approached actual position) can also be combined.

It is thereby advantageously possible to keep the amount of data (that is, the size) of the map small since the objects and track guidance markings that are actually present once do not have to be stored twice or a multiple of times. Furthermore, measurement errors in the distance marking data and track guidance marking data can be minimized or averaged out. In addition, an unambiguous map in which real objects are not included multiple times leads to better localization results.

The determination whether the actual current position of the vehicle along the path corresponds to the already previously approached actual position of the vehicle can in particular be based on the track following marking, and/or on the distances, and/or on the estimated movement of the vehicle, and/or on the estimated position of the vehicle.

The correction can e.g. be based on a graph optimization method. In the graph optimization method, nodes of the graph can correspond to the positions of the vehicle along the predefined path and edges of the graph can correspond to the distances and to the track guidance marking. For example, the graph optimization framework $g^2o$ can be used.

The track guidance marking can comprise unique codes having a known unique position in the navigation region. They can be advantageously used as reliable indicators in the determination whether a current actual position of the vehicle along the path corresponds to an already previously approached actual position of the vehicle.

With the mapping method in accordance with the invention (that is, the method in accordance with the invention of creating a map), the personnel that learn the routes of the AGVs do not have to be trained beyond the normal laying of the track. In particular, no work on a PC and thus no IT knowledge is necessary. The maps can be generated in a fully automated manner and do not require specially trained personnel. The travel course e.g. only has to be glued once such as also takes place with a normal putting into operation.

It is not necessary to carry out a continuous path planning such as is otherwise e.g. typical with laser localization. The mapping process (including the creation of the map and of the desired path) takes place in an automated manner after a single traveling along the course with the AGV. In contrast to a conventional mapping that only uses laser scanners, no special technical knowledge is required to set up the system in this respect.

The object of the invention is further satisfied by a method of determining a pose of a vehicle in a navigation region, comprising the following steps:

determining a position of the vehicle relative to a track guidance marking present in the navigation region;

determining distances of the vehicle from objects possibly present in an environment of the vehicle; and determining the pose based on the position, on the distances, and on a map, with the map comprising position information of objects and track guidance markings present in the navigation region.

Advantages, details, and preferred designs that are described for the method of creating the map also apply to the method of determining the pose, and vice versa.

The pose of the vehicle can include the position of the vehicle (as a two-dimensional position or as a three-dimensional position) and/or the orientation of the vehicle (as one angle, as two angles, or as three angles). The pose can be absolute or relative, for example, relative to the starting point of a path of the vehicle.

The determined pose can then be used to control the vehicle.

The map may have been created in accordance with the above-described method of creating the map. The pose can be determined based on a comparison with the map.

In a preferred embodiment, the pose is determined based on a Kalman filter method. In the Kalman filter method, a position of a keyframe is estimated.

Distance information that was determined at a specific location at which the vehicle was located during its journey is designated as a keyframe in this respect. The distance information stored as a keyframe can then be compared with distance information determined in the further course of the journey of the vehicle and a movement of the vehicle can thus be estimated.

The object of the invention is further satisfied by a mapping apparatus that comprises the following:
a drive interface adapted to control a drive of a vehicle;
a distance sensor interface adapted to receive a distance of a distance sensor, determined by means of the distance sensor, from objects possibly present in an environment of the distance sensor;
a track following sensor interface adapted to receive a position of a track following sensor, determined by means of the track following sensor, relative to a track guidance marking present in a navigation region; and
a control circuit adapted to;
control the drive via the drive interface such that the vehicle follows a path predefined by the track guidance marking;
determine distances from objects possibly present in an environment of the distance sensor along the path; and
create a map of the navigation region based on the track guidance marking and on the distances.

The distance sensor interface in this respect provides an interface to the distance sensor that can be arranged in the vehicle. The signal transmitted via the distance sensor interface represents the distance. For example, the signal can be an analog signal, for example a voltage whose level represents a distance. Alternatively, the signal can be a digital signal, wherein the distance is encoded in a binary sequence of bits.

The track following sensor interface provides an interface to the track following sensor that can be arranged in the vehicle. The signal transmitted via the track following sensor interface represents the position. For example, the signal can be an analog signal, for example, a voltage; whose level represents a position. Alternatively, the signal can be a digital signal, wherein the position is encoded in a binary sequence of bits.

The distance sensor interface and/or the track following sensor interface can be external interfaces having a connection to the mapping apparatus and can provide an electrical connection and a mechanical connection, for example, via a plug and a socket. Alternatively, the distance sensor interface and/or the track following sensor interface can be internal interfaces (for example, a fixed contact, a fixedly connected line, or a fixedly connected cable) if the mapping apparatus includes the distance sensor and/or the track following sensor.

The mapping apparatus and/or the drive and/or the distance sensor and/or the track following sensor can be a part of the vehicle or can be provided in a central unit that can, for example, be connected to the mapping apparatus via a wireless communication interface.

The drive can include one wheel or a plurality of wheels of the vehicle and/or a steering mechanism of the vehicle. A steering of the vehicle can be effected by the steering of one wheel or of a plurality of wheels of the vehicle or via a differential speed of driven wheels.

The drive can be controlled based on data received via the track following sensor interface. The mapping can be based on data received via the track following sensor interface and/or via the distance sensor interface.

The object of the invention is further satisfied by a localization apparatus comprising:
a distance sensor interface adapted to receive a distance of a distance sensor, determined by means of the distance sensor of a vehicle, from objects possibly present in an environment of the distance sensor;
a track following sensor interface adapted to receive a position of a track following sensor, determined by means of the track following sensor of the vehicle, relative to a track guidance marking present in a navigation region; and
a control circuit adapted to;
determine a position of the vehicle (relative to the present track guidance marking);
determine distances of the vehicle from objects possibly present in an environment of the vehicle; and
determine a pose of the vehicle based on the position, on the distances, and on a map, with the map comprising position information of objects and track guidance markings present in the navigation region.

Advantages, details and preferred embodiments that are described for any one of the above-described methods also apply to one or more of the apparatus, and vice versa.

The localization apparatus can be a part of the vehicle (that is, it can be provided in or at the vehicle). A mapping apparatus (for example, a mapping apparatus as described above) can likewise be a part of the vehicle (that is, it can be provided in or at the vehicle) so that the vehicle includes both the localization apparatus and the mapping apparatus. The map can therefore also be created with the vehicle that is to be localized later. Less sensor calibration can thereby be required since sensor errors are (implicitly) also mapped. Furthermore, the map can be updated in ongoing operation, similar to a SLAM process (simultaneous localization and mapping).

A control apparatus can be provided for controlling the vehicle, with the control apparatus including the localization apparatus. The localization apparatus then transmits the determined pose for further processing to the control apparatus that controls the drive, in particular also the steering mechanism.

Methods and apparatus in accordance with the invention for localization are robust against wear of track guidance markings that can occur during the operation of the system (for example, tracks can be torn off or codes can become illegible). In particular in the case of a defective physical track, the AGV can continue to follow a predefined lane and can thus prevent an interruption of the transport of goods. In addition, control commands can be output to the AGV even if the physical markings are no longer present or are defective. The system can be easily put into operation. The putting into operation is in this respect e.g. based on the putting into operation of previously used track-guided systems.

The mapping of the system is in particular possible without a manual processing of the map by skilled personnel. The map can also directly include route information.

Further advantageous embodiments of the method in accordance with the invention result from the dependent claims; from the drawing; and from the description.

The invention is further directed to a vehicle, in particular an automated guided vehicle, having an inventive localization apparatus, wherein signals of the localization apparatus are used to control the vehicle.

Figure 6A:
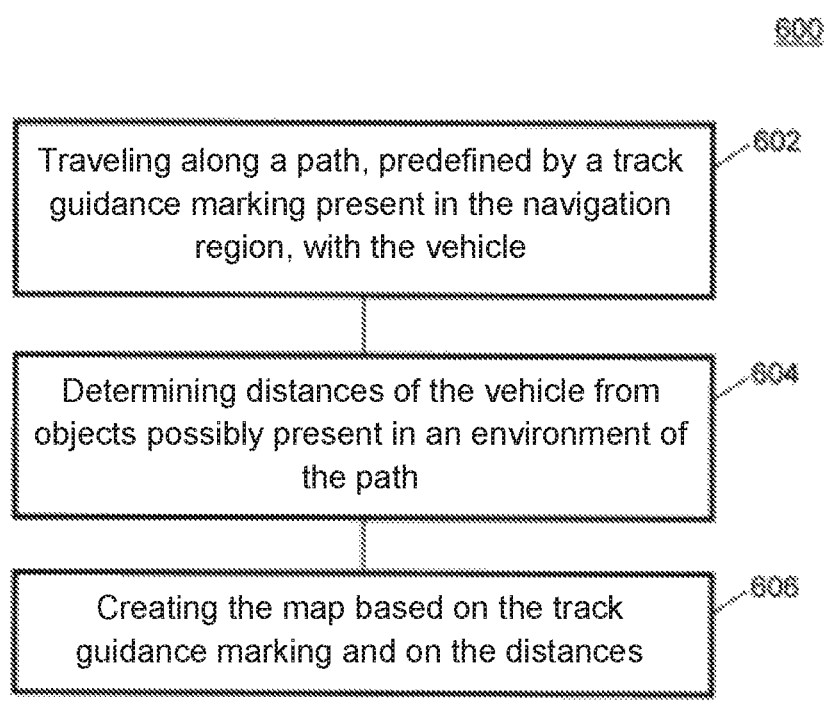
Figure 8B:
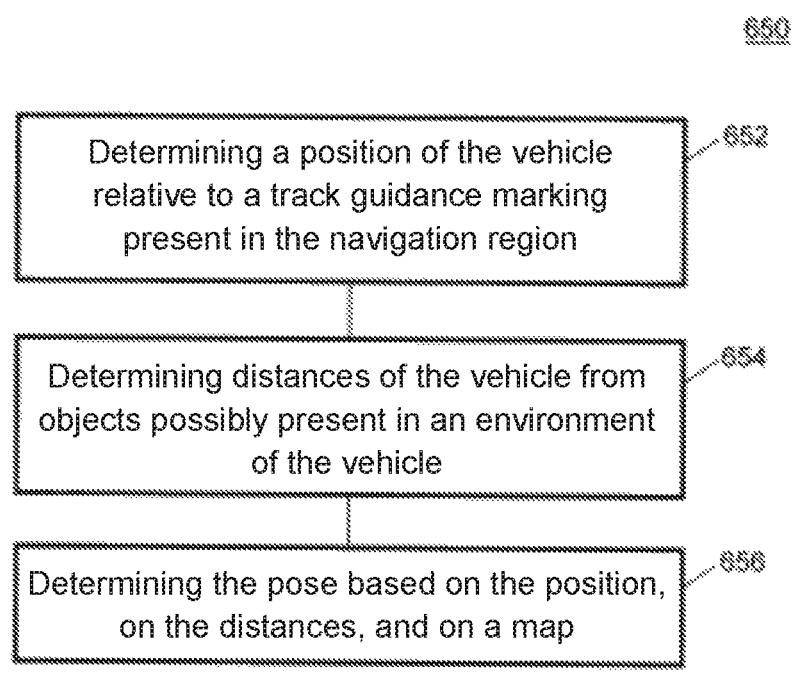

The invention will be described in the following with reference to embodiments and to the drawing. There are shown in schematic representations:

FIG. 1 an automated guided vehicle in accordance with an embodiment in accordance with the invention;

FIG. 2 a schematic representation of a track guidance with a simultaneous reading out of the control code in accordance with an embodiment;

FIG. 3A an exemplary map in accordance with an embodiment;

FIG. 3B an illustration of a mapping error;

FIG. 4 a schematic representation of prediction steps in accordance with an embodiment;

FIG. 5 a schematic representation of correction steps in accordance with an embodiment;

FIG. 6A a flowchart for illustrating a method of creating a map of a navigation region of a vehicle in accordance with an embodiment; and FIG. 6B a flowchart for illustrating a method of determining a pose of a vehicle in a navigation region in accordance with an embodiment.

In the following, the methods in accordance with the invention will be explained by way of example by means of an embodiment, wherein the method steps associated with the generation of the map are first explained in more detail.

FIG. 1 shows an automated guided vehicle 100 in accordance with an embodiment in accordance with the invention. The vehicle 100 can, for example, be configured as a mapping apparatus or as an AGV having a localization apparatus. The vehicle 100 comprises a drive having wheels 102, wherein the wheels 102 not only enable a driving, but also a steering. For this purpose, at least one of the wheels 102 can, for example, be steerable or the wheels 102 can be turned at different speeds so that a change in direction of the vehicle 100 is effected by a differential speed. One or more distance sensors 120, for example lidar or laser sensors, are attached to the vehicle 100. The usual direction of travel of the vehicle is shown by an arrow 122.

A section 106 of the front part of the vehicle 100 is shown enlarged in the left part of FIG. 1. In this respect, track guidance markings 114, 116 in the form of a branching track 116 and of a code 114 attached next to the track 116 that are also included in a map are shown in addition to components of the vehicle 100. The code 114 can include control information for the vehicle 100; for example speed specifications or direction specifications, that can be used to allow the vehicle 100 to continue traveling either to the left or to the right in the case of branches of the track 116. In this respect, a plurality of codes can be present in the navigation region, wherein a specific code can be present once or multiple times. A code only present once (which is thus unique) can be used to initialize the position of the vehicle 100. A code present multiple times (which is thus not unique) can be used for localization; in this respect, the fact is utilized that the vehicle 100 knows an estimate of its position and can thus obtain position information from the code despite the ambiguity if the same codes are disposed further apart.

The vehicle 100 includes at least one code reader 110 and at least one track sensor 108. A vehicle having a code reader 110 and two track sensors 108 is shown in FIG. 1. For example, the track sensors 108 can be designed as line sensors that have an extent substantially perpendicular to the usual direction of onward movement of the vehicle 100.

For example, the code 114 can include information on whether the vehicle 100 should follow the left path or the right path in the case of a branching. The code 114 can also, for example, include speed specifications for the vehicle 100.

Points 112 illustrate at which positions of the track sensors 108 tracks are recognized. Based on a currently estimated position, the vehicle 100 can determine to which parts 118 of the track 116 the points 112 belong. In the example shown in FIG. 1, the parts 118 of the tracks 116 are further to the left in the map than the recognized points 112. The vehicle 100 is therefore actually located further to the right (with respect to the direction of travel) than estimated. This can be corrected after evaluating the track sensors 108.

The vehicle 100 furthermore includes distance sensors 120. Even though distance sensors are only shown at the front side and at the rear side of the vehicle 100 in FIG. 1, distance sensors 120 can be attached to any desired side and or to one or more sides of the vehicle 100, FIG. 2 shows a schematic diagram 200 of a track guidance with a simultaneous reading out of the control code 114 in accordance with an embodiment. As shown by the double arrow 202, a deviation of the vehicle 100 from the center of the track 116 can be determined and the vehicle 100 can be kept on the track 116 by suitable control commands to the drive.

In an embodiment of the mapping method in accordance with the invention, the route of the AGV (for example, of the vehicle 100) is first defined by the attachment of tracks and codes on the floor of the system when the system is put into operation. A mapping of the system together with the laid out tracks and codes then takes place. After the mapping, parts of the track or even the complete track can be removed again without a localization of the vehicle thereby becoming impossible.

A map of the production system is created before the actual operation. For this purpose, the AGV is operated once on the provided course and the measurement values of the vehicle sensor system, in particular of the distance sensors 120 (for example, laser scanners), of the track guidance sensors 108 and of the code reader 110 or code sensor are recorded in so doing. A map of the system, such as is shown by way of example in FIG. 3A, is then generated from the recorded measurement values.

FIG. 3A shows an exemplary map 300 in accordance with an embodiment. The map 300, which can also be called a topographical map, comprises contours 306 of the environment from the point of view of the laser scanners 120; the present track 302; and the markings 304 attached next to the track 302, that is, the codes attached next to the track 302. The map 300 created can be distributed or copied to a plurality of vehicles 100.

The mapping process can take place in an automated manner. The generated map 300 is checked for plausibility in this respect. For this purpose, a check can, for example, be made whether the track 302 extends through contours 306, which is physically impossible. Such implausibilities can be displayed to the user and the mapping can be discarded and a new mapping can be started.

During the recording journey (that is, the journey for mapping), the movement of the vehicle 100 is estimated based on the distance measurements, for example of the laser scanner, and/or on the odometry, for example via the wheel speeds, and the distance data (for example, the laser data), the code data, and the track data are pre-processed and stored.

The estimated movement of said vehicle can be used to arrange the data (that is, the distance data, the code data, and the track data) in a map. However, errors can occur in this respect that accumulate over time and that can become larger and larger, which can lead to inconsistent maps.

FIG. 3B shows an illustration 350 of such an error. A vehicle can start at a starting position 352 and travel along a predefined path 354. After the path 354 has been traveled along, the vehicle is present at the starting position 352 again. However, due to errors in the estimated position that can add up, the vehicle estimates that it will travel along the path 356 shown by dashed lines and, after the actual traveling along the path 354, it will not be at the position of the starting position 352, but rather at an estimated position 358 that differs from the starting position 352. However, if the vehicle now knows that it is actually at the position 352 at which it estimates its position as the position 358, this deviation (that is, this error) can be corrected.

To correct this error, so-called loop closures are used, that is, positions at which the vehicle travels over an already visited position again. These loop closures can, for example, be determined based on the read unique codes since the unique codes include exactly such information (position already known).

The loop closures are e.g. used by means of a graph-based optimization (for example, by means of the $g^2o$ framework) to correct the error in the estimated movement of said vehicle.

However, other optimization or filter methods can also be used.

To further improve the map, the observed tracks are not only entered into the map, but are also used algorithmically. For this purpose, an additional condition is integrated in the graph-based optimization that tracks observed multiple times (this can result from multiple visits to the same position such as also arise due to the use of multiple track following sensors) are drawn on one another. In a further step, these tracks present multiple times are then combined into a single track.

The codes read are also entered into the map based on the estimated vehicle positions and are combined—if observed multiple times.

To locate the vehicle, the pose of the vehicle with respect to the mapped course can be determined in ongoing operation on the basis of the map determined as described above by means of the sensor technology of the AGV (for example, by means of the distance sensor, the track sensor, and the code reader).

For this purpose, the measurement values of the following sensors are used in accordance with an embodiment: the distance sensor (for example, a laser scanner), the odometry of the vehicle (for example, a wheel coder and a steering angle), the code reader, and the track sensors. External localization systems can be dispensed with and only sensor technology that is attached to the vehicle can be used. With such a system, it is therefore possible to manage without modifying the system in which the vehicle is to travel, in particular without setting up external sensors.

An unscented Kalman filter (UKF) can be used to calculate the vehicle pose. It estimates the probability distribution of the pose of the vehicle under the assumption that said pose is distributed normally. The UKF makes it possible to take into account the uncertainties of the measurement values of the different sensors, which increases the accuracy and robustness of the pose estimation. To estimate the pose, a localization method in accordance with an embodiment of the invention can work in two cycles (or steps): prediction and correction. They are described in more detail in the following and it will be shown how the sensor measurement values are used by the method.

In the prediction step, the pose of the vehicle is precalculated until the next time step. This takes place on the basis of a scan matcher that compares the current laser scan with a previously measured keyframe. The result of the scan matcher is the pose change with respect to the keyframe together with its uncertainty that can be modeled as a covariance. As soon as most of the keyframe moves out of the field of view of the laser scanners, the current laser scan is stored as a new keyframe.

To be able to use the information of the scan matcher within the UKF, the state of the vehicle is defined as its global pose together with the global pose of the keyframe. As long as the scan matcher does not select a new keyframe, its information is used to precalculate the pose of the vehicle. The uncertainty of the vehicle pose is therefore composed of the estimated uncertainty of the pose of the last keyframe and of the uncertainty of the currently calculated pose change with respect to the keyframe. As soon as the keyframe of the scan matcher changes, the current global pose of the vehicle is set as the pose of the new keyframe.

The prediction in accordance with an embodiment allows a drift-free prediction as long as the keyframe does not change. As soon as the keyframe changes, its global uncertainty is described correctly.

FIG. 4 shows a schematic representation 400 of the prediction in accordance with an embodiment. In this respect, estimated vehicle poses are in this respect each shown as a circle having an orientation and uncertainties of the estimate are shown as ellipses around this circle. A larger ellipse means a greater uncertainty in this respect. At a first estimated pose 402 having an uncertainty 404, the estimated pose 402 is set as a keyframe. The next estimated pose 406 already has a greater uncertainty 408. The subsequently estimated pose 410 in turn has an increased uncertainty 412. In the next pose 414 having an uncertainty 416, the keyframe is reset since the previous keyframe (that is, the keyframe from the pose 402) is outside the field of view of the laser scanner. The next estimated pose 418 in turn has an increased uncertainty 420. In the next pose 422 having an uncertainty 424, the keyframe is reset since the previous keyframe (that is, the keyframe from the pose 414) is outside the field of view of the laser scanner. An estimated path 426 can be determined based on the estimated poses. In this respect, only exemplary poses and uncertainties are shown in FIG. 4. The actual density of poses along the path 426 can be higher than shown in FIG. 4. FIG. 4 furthermore shows the connection lines 428, 430, 432, 434, 436 of the respective current pose to the respective current keyframe.

Whereas it is shown by way of example in FIG. 4 that the uncertainty increases from pose to pose, the uncertainty does not necessarily have to generally increase from pose to pose if no new keyframe is set. For example, the uncertainty 412 could be smaller than the uncertainty 408, but not smaller than the uncertainty 404. How much bigger the uncertainty is compared to the keyframe only depends on the result of the scan matcher of this specific scan against the keyframe. The subsequent scan may fit better than the previous one so that the uncertainty may not increase or may even be reduced.

In the correction step, the generated prediction (from the step of the prediction) is corrected using sensor data. For example, the following sensor information can be used for this purpose: mapped object distances (in other words: reference scans), mapped tracks, and/or mapped codes.

In the correction by means of reference scans (that is, in comparison with reference scans), a scan matcher is used to compare the current scan with the reference scans that were previously stored in a map by the mapping process.

The reference scans comprise the pose at which the scan was recorded, its uncertainty, and the scan itself (that is, the distance information, for example, the contours 306 shown in FIG. 3). In this step, recognized reflectors that are attached in the environment can be weighted higher than contours having a normal remission. Contours having a normal remission result from "natural" objects that are present in the navigation region, such as buildings, shelves, walls, and the like, whereas reflectors can be attached in the navigation region solely for a better localization. This can increase the robustness of the system since reflectors enable a reliable association between the mapped structure and the recorded scan.

FIG. 5 shows a schematic representation 500 of the correction in accordance with an embodiment. A plurality of poses 526, 528, 530, 532, 534, 536, 538 at which reference scans were created and mapped can be used to correct a vehicle moving along a path 544. As soon as a correction takes place by means of a mapped reference scan, the uncertainty of the estimated vehicle position becomes smaller. At a first estimated pose 502 shown, the uncertainty 504 is small since a correction is made by means of a reference scan 526 here, as shown by an arrow 540. Uncertainties are represented by ellipses around the poses in FIG. 5 similar to in FIG. 4. The uncertainty 508 is already greater at a next pose 506. The uncertainty 512, 514 increases further in the following poses 510, 514. At a pose 518, the pose is corrected—as shown by an arrow 542—by means of a reference scan 532 so that the uncertainty 520 is reduced. The uncertainty 524 of the following estimate of the pose 522 is then increased again.

In this respect, a correction step does not have to take place after each prediction step, but a plurality of prediction steps can rather take place before a correction step is performed. Furthermore, it can be avoided that corrections are made too often (for example, too often in succession or too often within a predefined period of time) by means of the same reference scan to avoid an error in the evaluation of the uncertainty (in the sense of an overconfidentiality).

Furthermore, a correction can be discarded if the correction seems implausible, for example, because too large a correction would have to be made.

In accordance with an embodiment, the locally nearest reference scan does not necessarily have to be used for the correction. For example, it is shown in FIG. 5 that the reference scan 526 is used for the correction even though the reference scan 528 is disposed closer to the estimated pose 502. The reason can be that the reference scan 528 has already been used before, or that a correction based on the reference scan 528 seems implausible, or that the reference scan 528 is separated from the estimated pose 502 by a wall or another obstacle.

In the correction by means of reference scans, it is possible to make a comparison with a grid map (i.e. to match against a grid map). The same scan matching principle as for the incremental movement estimation can be used for the correction by means of reference scans. Alternatively, other methods can be used for the correction.

In the correction by means of mapped tracks (that is, in the comparison with mapped tracks), the measurements of the line sensors are used when the vehicle travels on a track that was previously mapped in order to correct the vehicle pose. For this purpose, the line segments of the total mapped track are selected that correspond the most to the measurements of the track (for example, the parts 118 of the track 116 as shown in FIG. 1) The estimated pose of the vehicle is changed via the correction step such that the distance of the actual track measurement from the mapped track segments is minimal.

This additional information of the track measurement increases the accuracy of the localization as well as its robustness. As long as a track is present (that is, the track was not, for example, torn off or deliberately removed), a better pose estimate is available.

This information is used for the pose estimation in the correction by means of mapped codes (that is, in the comparison with mapped codes) if a mapped code is recognized by the code reader. For this purpose, the difference of the absolute position of the code reader from the position of the code in the map is minimized by the correction. Furthermore, errors in the localization are detected by recognized codes if the code is too far away from the vehicle according to the map.

For example, as shown in FIG. 1, the line segments 118 can be selected via the points 112 of the track measurements of the line sensors as pieces of the track map (that is, of the mapped tracks in the map) that are suitable for correction. Equally, the spacing of a recognized code 14 from the code reader 110 can be used to correct the estimated pose.

For initialization, the vehicle is driven via a mapped code in accordance with an embodiment. A reference scan is available at each code, which can be ensured by the mapping process. The global pose of the vehicle is calculated via a scan matching step by means of the current scan of the laser scanner. Convergence is ensured since it is known in which direction the vehicle is traveling via the code. This results in a very robust and accurate initialization.

FIG. 6A shows a flowchart 600 for illustrating a method of creating a map of a navigation region of a vehicle in accordance with an embodiment. In 602, a path predefined by a track guidance marking present in the navigation region can be traveled along with the vehicle. In 604, distances of the vehicle from objects possibly present in an environment of the path can be determined. In 606, the map can be created based on the track guidance marking and on the distances.

FIG. 6B shows a flowchart 650 for illustrating a method of determining a pose of a vehicle in a navigation region in accordance with an embodiment. In 652, a position of the vehicle relative to a track guidance marking present in the navigation region can be determined. In 654, distances of the vehicle from objects possibly present in an environment of the vehicle can be determined. In 656, the pose can be determined based on the position, on the distances, and on a map, with the map having position information of objects and track guidance markings present in the navigation region.

The robustness of the methods and apparatus can be increased as follows at positions that are e.g. problematic for a laser localization; reflectors can be used; the system can be used in parallel with a conventional track guidance; and present tracks and codes can increase the robustness and accuracy of the system so that it has an increased availability at positions at which the tracks and codes are no longer present.

REFERENCE NUMERAL LIST 100 vehicle
102 wheel
106 section of the vehicle
108 track sensor
110 code reader
112 point at which a track was recognized
114 code
116 track guidance marking
118 parts of the track
120 distance sensor
122 usual direction of travel of the vehicle
200 schematic representation of a track guidance
202 deviation
300 map
302 track
304 markings
306 contours
350 illustration of a localization error
352 starting position
354 path actually traveled along
356 estimation of the path traveled along
358 estimated position
400 representation of the prediction in accordance with one embodiment
500 representation of the correction in accordance with another embodiment
402, 406, 410, 414, 418, 422, 502, 506, 510, 514, 518, 522 estimated pose
404, 408, 412, 416, 420, 424, 504, 508, 512, 516, 520, 524 uncertainty
426 estimated path
428, 428, 430, 432, 436 connection line
526, 528, 530, 532, 534, 536, 538 pose at which a reference scan was prepared and mapped
540, 542 correction
544 path
600 flowchart of a method of creating a map
650 flowchart of a method of determining a pose of a vehicle
602, 604, 606, 652, 654, 656 method step

The invention claimed is:

1. A method of creating a map of a navigation region of a vehicle, the method comprising:
traveling along a path with the vehicle, with said path being predefined by at least one track guidance marking present in the navigation region using a track following sensor mounted on board the vehicle, said traveling of the vehicle being driven through a drive interface in communication with a control circuit carried on board the vehicle, and said track following sensor communication with the control circuit through a track following sensor interface, the drive interface controlling the traveling of the vehicle based on a signal generated by the track following sensor interface representative of data received by the track following sensor from the at least one track guidance marking, the data including speed and/or directional control instructions for the vehicle, and wherein the at least one track guidance marking is selected from the group consisting of an optical track guidance marking, an electrical track guidance marking, a magnetic track guidance marking, and combinations thereof;
determining distances of the vehicle from objects possibly present in an environment of the path using a distance sensor mounted on board the vehicle, the distance sensor communicating with the control circuit through a distance sensor interface; and
creating the map based on the at least one track guidance marking and on the distances, wherein the map is created by the control circuit, and wherein the map comprises position information of the objects and the at least one track guidance marking present in the navigation region.

2. The method in accordance with claim 1, further comprising:
determining at least one estimated position of the vehicle based on an estimated movement of the vehicle.

3. The method in accordance with claim 2,
wherein the movement of said vehicle is estimated based on the distances.

4. The method in accordance with claim 2,
wherein the movement of said vehicle is based on measurements of a speed of at least one wheel of the vehicle.

5. The method in accordance with claim 2,
wherein the map is further based on the estimated position.

6. The method in accordance with claim 5,
wherein, for a plurality of estimated positions, the map comprises:
position information on objects in an environment of the estimated position; and
information on a track guidance marking present at the estimated position.

7. The method in accordance with claim 1, further comprising:
determining whether a current actual position of the vehicle along the path corresponds to an already previously approached actual position of the vehicle; and,
if it is determined that the current actual position corresponds to the already previously approached actual position, performing a correction of the map to bring together the estimated position determined at the current actual position of the vehicle and the estimated position determined at already previously approached actual position of the vehicle.

8. The method in accordance with claim 7,
wherein the determination whether the actual current position of the vehicle along the path corresponds to the already previously approached actual position of the vehicle is based on at least one of the track following marking and the distances.

9. The method in accordance with claim 7,
wherein the correction is performed based on a graph optimization method.

10. The method in accordance with claim 9,
wherein, in the graph optimization method, nodes of the graph correspond to positions along the predefined path and edges of the graph correspond to the distances and to the track guidance marking.

11. The method in accordance with claim 1,
wherein the track guidance marking comprises unique codes having a known unique position in the navigation region.

12. A method of determining a pose of a vehicle in a navigation region, the method comprising:
determining a position of the vehicle relative to a track guidance marking present in the navigation region using a track following sensor mounted on board the vehicle, said track following sensor being in communication with a control circuit mounted on board the vehicle through a track following sensor interface, wherein the track guidance marking is selected from the group consisting of an optical track guidance marking, an electrical track guidance marking, a magnetic track guidance marking, and combinations thereof, and wherein the track guidance marking includes at least one code comprising speed and/or directional control instructions for the vehicle;

determining distances of the vehicle from objects possibly present in an environment of the vehicle using a distance sensor mounted on board the vehicle, the distance sensor communicating with the control circuit through a distance sensor interface;

determining the pose based on the position, on the distances, and on a map, with the map comprising position information of objects and track guidance markings present in the navigation region, wherein the map is created by the control circuit, and the pose is generated by the control circuit; and controlling travel of the vehicle, wherein a drive interface controls the travel of the vehicle based on the determined pose of the vehicle.

13. The method in accordance with claim 12,
wherein the pose is determined based on a Kalman filter method.

14. The method in accordance with claim 13,
wherein a position of a keyframe is estimated in the Kalman filter method.

15. A mapping apparatus comprising:
a drive interface adapted to control a drive of a vehicle;
a distance sensor interface adapted to receive a distance of a distance sensor, determined by means of the distance sensor, from objects possibly present in an environment of the distance sensor;
a track following sensor interface adapted to receive a position of a track following sensor, determined by means of the track following sensor, relative to at least one track guidance marking present in a navigation region, wherein the at least one track guidance marking is selected from the group consisting of an optical track guidance marking, an electrical track guidance marking, a magnetic track guidance marking, and combinations thereof; and
a control circuit adapted to:
control the drive via the drive interface such that the vehicle follows a path predefined by the track guidance marking, wherein the drive interface controls travel of the vehicle based on a signal generated by the track following sensor interface representative of data received by the track following sensor from the at least one track guidance marking, the data including speed and/or directional control instructions for the vehicle;
determine distances from objects possibly present in an environment of the distance sensor along the path; and
create a map of the navigation region based on the at least one track guidance marking and on the distances, wherein the map comprises position information of the objects and the at least one track guidance marking present in the navigation region,
wherein the control circuit communicates with the drive interface, the distance sensor interface, and the track following sensor interface.

16. A localization apparatus, comprising:
a distance sensor interface adapted to receive a distance of a distance sensor, determined by means of the distance sensor of a vehicle, from objects possibly present in an environment of the distance sensor;
a track following sensor interface adapted to receive a position of a track following sensor, determined by means of the track following sensor of the vehicle, relative to a track guidance marking present in a navigation region, wherein the track guidance marking is selected from the group consisting of an optical track guidance marking, an electrical track guidance marking, a magnetic track guidance marking, and combinations thereof, and wherein the track guidance marking includes at least one code comprising speed and/or directional control instructions for the vehicle; and
a control circuit adapted to:
determine a position of the vehicle relative to the present track guidance marking;
determine distances of the vehicle from objects possibly present in an environment of the vehicle;
determine a pose of the vehicle based on the position, on the distances, and on a map, with the map comprising position information of objects and track guidance markings present in the navigation region; and
control travel of the vehicle based on the determined pose of the vehicle;
wherein the control circuit communicates with the distance sensor interface and the track following sensor interface.

\* \* \* \* \*